(No Model.)

G. O. RINMAN.
APPARATUS FOR REDUCING PIPE JOINTS.

No. 524,400. Patented Aug. 14, 1894.

Witnesses.
J. Thomson Cross
James N. Ramsey

Inventor:
Gustav O. Rinman,
By Gus. B. Gustinder,
His Attorney.

THE NORRIS PETERS CO., PHOTO-LITHO., WASHINGTON, D. C.

UNITED STATES PATENT OFFICE.

GUSTAVE O. RINMAN, OF CINCINNATI, OHIO.

APPARATUS FOR REDUCING PIPE-JOINTS.

SPECIFICATION forming part of Letters Patent No. 524,400, dated August 14, 1894.

Application filed October 28, 1893. Serial No. 489,369. (No model.)

*To all whom it may concern:*

Be it known that I, GUSTAVE O. RINMAN, a citizen of the United States of America, residing at Cincinnati, in the county of Hamilton and State of Ohio, have invented certain new and useful Improvements in Apparatus for Reducing Pipe-Joints, of which the following is a specification.

In the process of welding by electricity, the two pieces of metal to be welded are placed with their ends together, an electric current is passed through the sections from opposite directions causing the metal to fuse. As the fusing of the metal continues the sections are subjected to an end pressure causing the metal to spread forming an enlargement or bulge at the joint.

The object of my invention is to provide improved apparatus for reducing the enlargement of the joint.

My invention consists in the apparatus hereinafter described and claimed.

Figure 1:
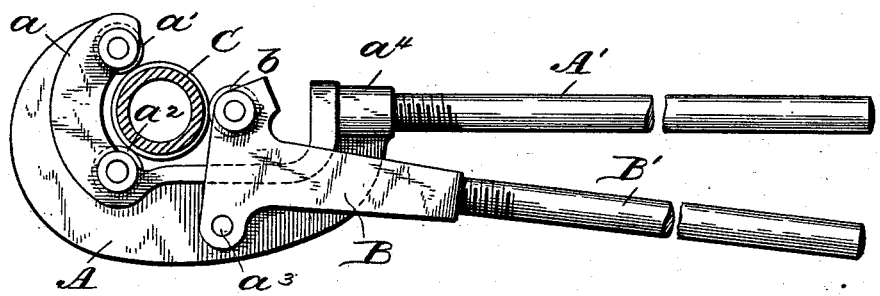
Figure 2:
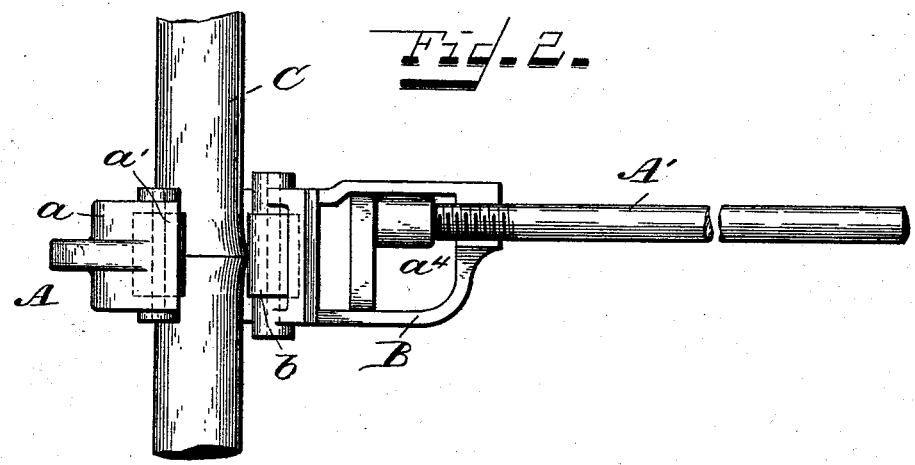

In the drawings: Figure 1 is a side view of my improved reducing tool, and Fig. 2 is a top view of the same.

A designates the stock of the tool having a jaw $a$ formed thereon in which are mounted two bearing rollers $a'$, $a^2$.

B designates the clamping jaw, forked to straddle the stock and fulcrumed on each side thereof on bearings $a^3$. The clamping-jaw is provided with a bearing roller $b$ and is adapted to clamp a bar or pipe C in engagement with the rollers $a'$, $a^2$.

The stock is provided with an internally screw threaded shank $a^4$ adapted to receive a handle or lever A' screw-threaded at the inner end. The threaded end may be passed through the shank to abut against the clamping jaw and limit its movement to any desired extent.

The operation is as follows: After a bar or pipe has been welded, the rollers $a'$, $a^2$, are placed against the joint, the roller $b$ in the clamping jaw is brought in contact therewith, the tool revolved, and the pressure of the rollers upon the bar gradually increased by pressing the handles or levers toward each other until the joint is reduced to the circumference of the pipe or bar.

What I claim is—

1. In a tool for compressing pipe joints, the combination of a stock, bearing rollers mounted therein, a clamping jaw fulcrumed on the stock, a bearing roller mounted in the jaw, and a lever for operating the clamping jaw, substantially as and for the purpose specified.

2. In a tool for reducing pipe joints, the combination of the stock A, a jaw $a$ formed thereon, bearing rollers $a'$, $a^2$, mounted therein, a clamping jaw B fulcrumed on the stock, a bearing roller $b$ mounted in the jaw, and levers A' and B' for operating the rollers, substantially as and for the purpose specified.

GUSTAVE O. RINMAN.

Witnesses:
FRANK O. LOVELAND,
B. W. SOMMERS.